United States Patent
Lee et al.

(10) Patent No.: US 12,208,392 B2
(45) Date of Patent: Jan. 28, 2025

(54) PARTICULATE MATTER DETECTION DEVICE AND DETECTION METHOD

(71) Applicant: NANJING YITIAN BIOTECHNOLOGY CO., LTD., Nanjing (CN)

(72) Inventors: Chen-Yi Lee, Nanjing (CN); Chao-Hong Chen, Nanjing (CN); Jyun-Hong Wang, Nanjing (CN); Yi Lu, Nanjing (CN)

(73) Assignee: SHANGHAI SGLCELL BIOTECH CO., LTD., Shanghai (CN)

( * ) Notice: Subject to any disclaimer, the term of this patent is extended or adjusted under 35 U.S.C. 154(b) by 793 days.

(21) Appl. No.: 16/617,634

(22) PCT Filed: Aug. 30, 2018

(86) PCT No.: PCT/CN2018/103171
§ 371 (c)(1),
(2) Date: Nov. 27, 2019

(87) PCT Pub. No.: WO2019/165770
PCT Pub. Date: Sep. 6, 2019

(65) Prior Publication Data
US 2020/0086320 A1 Mar. 19, 2020

(30) Foreign Application Priority Data
Feb. 28, 2018 (CN) .......................... 201810169100.5

(51) Int. Cl.
*B01L 3/00* (2006.01)
*B03C 5/00* (2006.01)
(Continued)

(52) U.S. Cl.
CPC ........ *B01L 3/502761* (2013.01); *B03C 5/005* (2013.01); *B03C 5/026* (2013.01);
(Continued)

(58) Field of Classification Search
CPC ............... G01N 15/06; G01N 15/1031; G01N 15/1459; G01N 2015/1486;
(Continued)

(56) References Cited

U.S. PATENT DOCUMENTS

| 9,915,599 B2 | 3/2018 | Brun et al. |
| 2004/0033483 A1 | 2/2004 | Oka et al. |

(Continued)

FOREIGN PATENT DOCUMENTS

| CN | 1464909 A | 12/2003 |
| CN | 1838999 A | 9/2006 |

(Continued)

OTHER PUBLICATIONS

U.S. Appl. No. 16/639,117, filed Feb. 13, 2020, Lee at al.
(Continued)

*Primary Examiner* — Dean Kwak
(74) *Attorney, Agent, or Firm* — Parker Highlander PLLC

(57) ABSTRACT

A particulate matter detection device and a detection method, in particular, a detection device and detection method based on a dielectrophoresis and electrical impedance measurement technology is provided, and more in particular, an electrical impedance detection device utilizing a microfluidic chip, and an application thereof for detecting target particles are provided. The device comprises a sample introducing part, a main channel (3), a dielectrophoresis electric field generating part, and an electrical impedance measurement part. By using the dielectrophoresis electric field generating part to selectively control target cells, detection or counting is performed on a sample flexibly and precisely without the use of labels and antibodies.

8 Claims, 5 Drawing Sheets

(51) Int. Cl.
  *B03C 5/02* (2006.01)
  *G01N 15/1031* (2024.01)
  *G01N 15/149* (2024.01)

(52) U.S. Cl.
  CPC .. *G01N 15/1031* (2013.01); *B01L 2200/0652* (2013.01); *B01L 2300/0816* (2013.01); *G01N 15/149* (2024.01)

(58) Field of Classification Search
  CPC .. G01N 2015/149; B03C 5/005; B03C 5/026; B01L 2200/0652; B01L 2300/0645; B01L 2300/0816; B01L 2400/0424; B01L 3/502761; B01L 3/502776
  See application file for complete search history.

(56) References Cited

U.S. PATENT DOCUMENTS

| | | | |
|---|---|---|---|
| 2004/0233424 A1* | 11/2004 | Lee | G01N 15/1484 356/246 |
| 2005/0266298 A1 | 12/2005 | Mitchell et al. | |
| 2008/0136797 A1* | 6/2008 | Sah | G02F 1/13454 345/204 |
| 2009/0301883 A1 | 12/2009 | Chung et al. | |
| 2012/0084022 A1* | 4/2012 | Giovangrandi | G01F 1/588 702/45 |
| 2012/0142032 A1 | 6/2012 | Morgan et al. | |
| 2015/0377763 A1 | 12/2015 | Brun et al. | |

FOREIGN PATENT DOCUMENTS

| | | |
|---|---|---|
| CN | 101046458 A | 10/2007 |
| CN | 101201350 A | 6/2008 |
| CN | 101441186 A | 5/2009 |
| CN | 102099666 A | 6/2011 |
| CN | 102128777 A | 7/2011 |
| CN | 102401760 A | 4/2012 |
| CN | 102460114 A | 5/2012 |
| CN | 102530834 A | 7/2012 |
| CN | 102866193 A | 1/2013 |
| CN | 103175950 A | 6/2013 |
| CN | 103323383 A | 9/2013 |
| CN | 103439241 A | 12/2013 |
| CN | 203337513 U | 12/2013 |
| CN | 104061969 A | 9/2014 |
| CN | 203947103 U | 11/2014 |
| CN | 104195028 A | 12/2014 |
| CN | 104697917 A | 6/2015 |
| CN | 104969063 A | 10/2015 |
| CN | 204878137 U | 12/2015 |
| CN | 205120654 U | 3/2016 |
| CN | 106093146 A | 11/2016 |
| CN | 106215984 A | 12/2016 |
| CN | 106492891 A | 3/2017 |
| CN | 106769698 A | 5/2017 |
| CN | 106925358 A | 7/2017 |
| CN | 107045068 A | 8/2017 |
| CN | 107189929 A | 9/2017 |
| CN | 107583695 A | 1/2018 |
| CN | 108344678 A | 7/2018 |
| CN | 108387488 A | 8/2018 |
| CN | 110823787 A | 2/2020 |
| DE | 2412165 A1 | 9/1975 |
| EP | 3418717 A1 * | 12/2018 ............ B01L 3/5027 |
| WO | WO-2014/036915 A1 | 3/2014 |
| WO | WO-2014/122873 A1 | 8/2014 |
| WO | WO-2015/164847 A1 | 10/2015 |
| WO | WO-2017/055581 A1 | 4/2017 |
| WO | WO-2017/202932 A2 | 11/2017 |
| WO | WO-2018/035602 A1 | 3/2018 |

OTHER PUBLICATIONS

Chinese Office Action for CN Application 201810169100.5, 15 pages (mailed Mar. 11, 2019).
Chinese Office Action for CN Application 201810169100.5, 14 pages (mailed Nov. 18, 2019).
Chinese Office Action for CN Application 201810381143.X, 23 pages (mailed Mar. 2, 2020).
International Search Report for PCT/CN2018/103116, 6 pages (mailed Jan. 8, 2019).
International Search Report for PCT/CN2018/103171, 14 pages, English translation, (mailed Jan. 15, 2019).
Scott, R. et al., Three-dimensional hydrodynamic focusing in a microfluidic Coulter counter, Review of Scientific Instruments, 79(4):046104.1-046104.3 (2008).
Written Opinion for PCT/CN2018/103116, 3 pages (mailed Jan. 8, 2019).
Written Opinion for PCT/CN2018/103171, 3 pages, (mailed Jan. 15, 2019).
Chinese Office Action for CN Application 201810381143.X, 9 pages (mailed Nov. 25, 2020).
Song, H. et al., Identification of Mesenchymal Stem Cell Differentiation State Using Dual-micropore Microfluidic Impedance Flow Cytometry, Anal. Methods, 1-13 (2016).

* cited by examiner (c)

(d)

PARTICULATE MATTER DETECTION DEVICE AND DETECTION METHOD

CROSS REFERENCE TO RELATED APPLICATIONS

This application is a U.S. National Stage Entry of International Application No. PCT/CN2018/103171, filed on Aug. 30, 2018, and titled with "PARTICULATE MATTER DETECTION DEVICE AND DETECTION METHOD", which claims the priority of Chinese Patent Application No. 201810169100.5, filed on Feb. 28, 2018, and titled with "PARTICULATE MATTER DETECTION DEVICE AND DETECTION METHOD", and the disclosures of which are hereby incorporated by reference.

FIELD

The present disclosure relates to a device and a method for detecting particles, by using dielectrophoresis (DEP) and impedance measurement, specifically to an impedance detecting microfluidic chip enhanced by dielectrophoresis, and a detection method using the same.

BACKGROUND

Impedance measurement techniques is mostly conducted by focusing particles to be a single particle stream using microfluidic control chip or electric field, before passing through the measuring electrode, followed by detecting and counting of the particles based on the obstruction and resistance of the particles to the measuring voltage or current. However, when a sample (such as blood) is actually detected, since the size of target particles (such as circulating tumor cells, CTCs) is equivalent to the size of non-target particles such as blood cells (especially white blood cells such as macrophages and monocytes), the impedance signals are fairly close, making it difficult to distinguish the different kind of particles solely based on the impedance signal. Therefore, additional cell labeling means to distinguish target particles such as fluorescence staining on target particles (such as cells) or use of detecting antibodies are usually required, which at the same time incurs additional steps and costs. As a result, there is an urgent need in the art for an impedance detection technique capable of distinguishing different kinds of particles without the addition of any markers.

SUMMARY

The inventors have unexpectedly found out that if a dielectrophoresis generating means is added into the impedance measurement device, the generated dielectric field, within a specific separation frequency window, will affect different kinds of cells in different manners. For example, the target cells (such as CTCs), upon which positive dielectrophoretic force acts, move towards the surface of the DEP electrode; while other blood cells, upon which negative dielectrophoretic force acts, are repelled by the DEP electrode and move away from the surface of the electrode, thereby two or more kinds of cells, originally mixed together inside the flow channel, being arranged at different vertical heights depending on the differences in the species and/or characteristics of the cells. The target cells are closer to the surface of the electrode, thereby producing more pronounced impedance signal to be detected; on the contrary, impurity cells are relatively far away from the surface of the electrode, thus no significant impedance signal can be detected. In this way, the resolution of signal is improved. On the base of the above findings, the inventors have completed the present invention.

In one aspect, the present disclosure provides a microfluidic chip for separating and detecting particles, comprising an inlet unit, a main channel (3), a dielectrophoresis-producing electric field generating unit and an impedance detection unit.

In one embodiment, the inlet unit comprises one or more sample channels (1), and optional one or more sheath channels (2), such as 1, 2 or 3 sample channels and 1, 2, 3, 4, 5 or 6 sheath channels, and as another example, one sample channel and two sheath channels. The one or more sample channels (1) and the optional one or more sheath channels (2) converge at one end and are connected with the main channel (3), so that the sample flow and the optional sheath fluid flow converge and flow into the main channel (3);

the dielectrophoresis-producing electric field generating unit and the impedance detection unit are successively provided on the main channel (3);

the dielectrophoresis-producing electric field generating unit comprises a dielectrophoresis-producing electrode (4) that is disposed at the top or the bottom of the main channel (3), for generating a non-uniform electric field in the direction perpendicular to the main channel, so that particles in the fluid flow in the main channel (3) are subjected to dielectrophoresis in the direction perpendicular to the main channel;

the impedance detection unit comprises an impedance measurement electrode (5), provided at the top or the bottom of the main channel (3), capable of responding to the particles flowing through the main channel (3) and generating an impedance detecting signal.

In another embodiment, the microfluidic chip comprises one or more, such as 1, 2, 3, 4 or 5, dielectrophoresis-producing electric field generating units; particularly, when two or more dielectrophoresis-producing electric field generating units are included, the dielectrophoresis-producing electrodes are preferably provided at the top and the bottom of the main channel, respectively.

In another embodiment, wherein at least one dielectrophoresis-producing electrode (4) is provided at the bottom of the main channel (3), for example, disposed on the substrate of the chip.

In another embodiment, wherein the at least one dielectrophoresis-producing electrode (4) is provided at the top of the main channel (3), for example, disposed on the cover plate above the substrate of the microfluidic chip.

In another embodiment, wherein the impedance measurement electrode (5) is provided at the bottom of the main channel (3), and preferably on the substrate of the chip.

In another embodiment, wherein the impedance measurement electrode (5) is provided on the top of the main channel (3), and preferably disposed on the cover plate above the substrate of the microfluidic chip.

In another embodiment, wherein the dielectrophoresis-producing electrode (4) is a conductive metal electrode or a photoelectric material having photoconductive effect such as amorphous silicon or zinc oxide (ZnO), etc., which can generate a non-uniform electric field via local illumination, thereby producing dielectrophoretic force.

In another embodiment, wherein the particles are cells of interest, for example, tumor cells, especially circulating tumor cells.

In the second aspect, the present disclosure provides an impedance detection device for separating and detecting particles, comprising the microfluidic chip in any embodiment of the above first aspect.

In one embodiment, which further comprises a dielectrophoresis-producing electric field signal generator connected to the dielectrophoresis-producing electrode (4), and/or an impedance signal receiver connected to the impedance detection unit; preferably comprises a sample injector connected to the inlet unit and/or an impedance signal analyzer connected to the impedance signal receiver.

In the third aspect, the present disclosure further provides a method for separating and detecting particles, which uses the microfluidic chip in the first aspect and/or the impedance detection device in the second aspect.

In one embodiment, the method comprises
a) injecting test sample through the sample channel (1) and optional sheath fluid through the optional sheath fluid channel (2) into the inlet unit, respectively, for example, the sample is derived from whole blood, plasma, urine, tissue fluid, cerebrospinal fluid, cell culture fluid or cell mixture; specifically, the sheath fluid is a sucrose PBS solution, and preferably, the sheath fluid comprises 280 mM sucrose, 137 mM NaCl, 2.7 mM KCl, 4.3 mM $Na_2HPO_4$ and 1.47 mM $KH_2PO_4$, with a pH of 7.4; preferably, sheath fluid has a conductivity of 10~500 mS/m, 30~300 mS/m or 50~100 mS/m, and more preferably, the conductivity of the sheath fluid is 50 mS/m;
b) generating a non-uniform electric field perpendicular to the direction of the main channel with the dielectrophoresis-producing electrode (4), making the target particles in the sample undergo dielectrophoresis, so that the target particles and non-target particles in the main channel (3) separate to form distinct layers in the direction perpendicular to the surface of the chip, with the liquid stream formed by the target particles being close to the side of the impedance measurement electrode (5) at the downstream of the main channel, and the liquid stream formed by the non-target particles being away from the side of the impedance measurement electrode (5) at the downstream of the main channel; specifically, the target particles are tumor cells, and preferably circulating tumor cells; specifically, the non-target cells are white blood cells, preferably peripheral blood mononuclear cells (PBMCs) or macrophages, and/or red blood cells; and
c) detecting the impedance signal of the flowing particles with the impedance detection unit.

In another embodiment, wherein by selecting frequency of the non-uniform electric field, the target and non-target particles are subjected to dielectrophoretic force in opposite directions within a specific separation frequency window.

In the fourth aspect, the present disclosure provides a use of the microfluidic chip in the first aspect and the impedance detection device in the second aspect, specifically, in detecting tumor cells. Particularly, the tumor cells are circulating tumor cells.

In the fifth aspect, the present disclosure further provides a use of the microfluidic chip in the first aspect and the impedance detection device in the second aspect in manufacturing a medical device for detecting tumor cells, Particularly, the tumor cells are circulating tumor cells.

The present disclosure merely illustrate some specific embodiments claimed, wherein the technical features recited in one or more embodiments may be combined with any one or more of the technical mediums. These combined technical mediums are also within the scope of the present application, as these combined technical mediums have been specifically described in the present disclosure.

By adopting the above technical solutions, the present disclosure provides at least one aspect of the following advantages and benefits. In the present disclosure, the selective manipulation of the target cells by using the dielectrophoresis-producing electrode (40) enables sensitive and accurate detection and counting of target cells (such as tumor cells, circulating tumor cells) in the samples (especially isolated blood cell samples or PBMC samples) without the use of any markers or antibodies. Compared to a conventional cell impedance detection device, the signal-to-noise ratio is significantly improved, and the requirement for the concentration of target cells in the test sample is greatly reduced (the detection can be normally conducted using the chip of the present disclosure when the ratio of non-target cells to target cells is greater than $10^6$). In addition, due to the operational simplicity and low detection cost of the present invention compared to the methods using fluorescence or antibody labeling, a good industrial application prospect is expected.

BRIEF DESCRIPTION OF DRAWINGS

The foregoing and other aspects of the present disclosure are clearly described through the detailed description and the accompanying drawings of the present disclosure. For illustrating the present disclosure with examples, the embodiments of the present disclosure are presently preferred, but it is understandable that the invention is not limited to the specific embodiments disclosed.

FIG. 1 (a) is a top view and FIG. 1 (b) is a side view. FIG. 1(c) shows the substrate and cover plate of some chips in the art. FIG. 1(d) is a schematic diagram showing the top of the main channel and the bottom of the main channel.

FIG. 3 (a) shows the impedance signal from the sample not subjected to cell focusing by dielectrophoresis, and FIG. 3 (b) shows the impedance signal from the sample subjected to cell focusing by dielectrophoresis.

FIG. 4 (b) shows the counting results of A549 cells when samples of PBMC mixed with different amounts of A549 cells are detected according to the method of Example 5 in the present disclosure, after separation by dielectrophoresis.

FIG. 4 (c) shows the counting results of A549 cells when samples of PBMC mixed with different amounts of A549 cells are detected according to the method of Example 5 in the present disclosure, without separation by dielectrophoresis.

DETAILED DESCRIPTION

Figure 1:
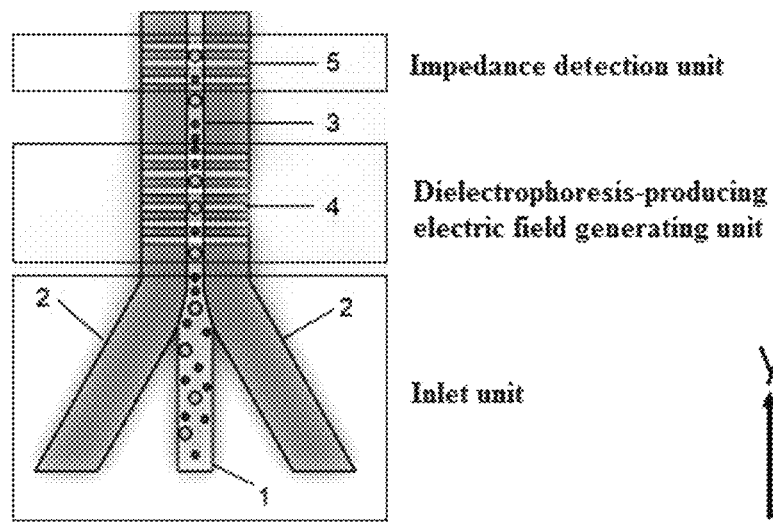
FIG. 1 is a schematic diagram of the microfluidic chip in accordance with one embodiment of the present disclosure.
Figure 1:
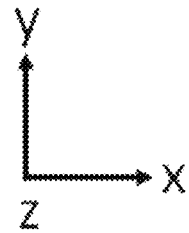
Figure 1:
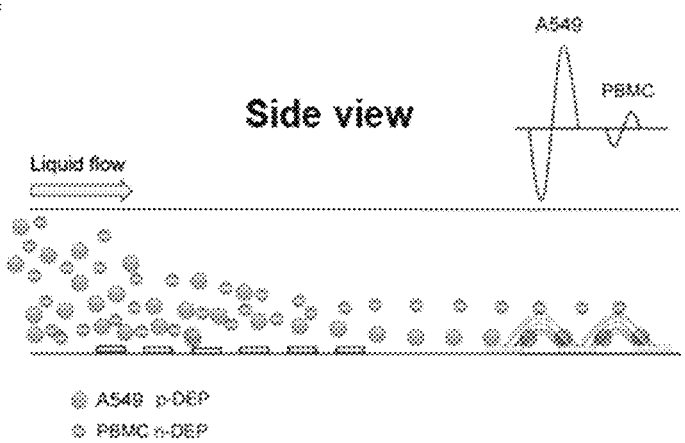
Figure 1:
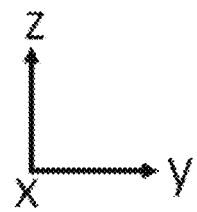
Figure 1:
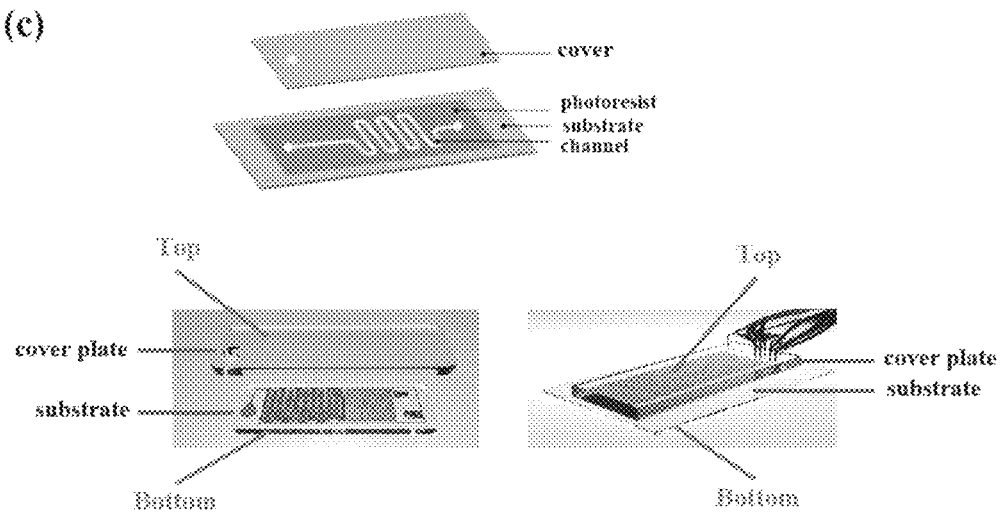
Figure 1:
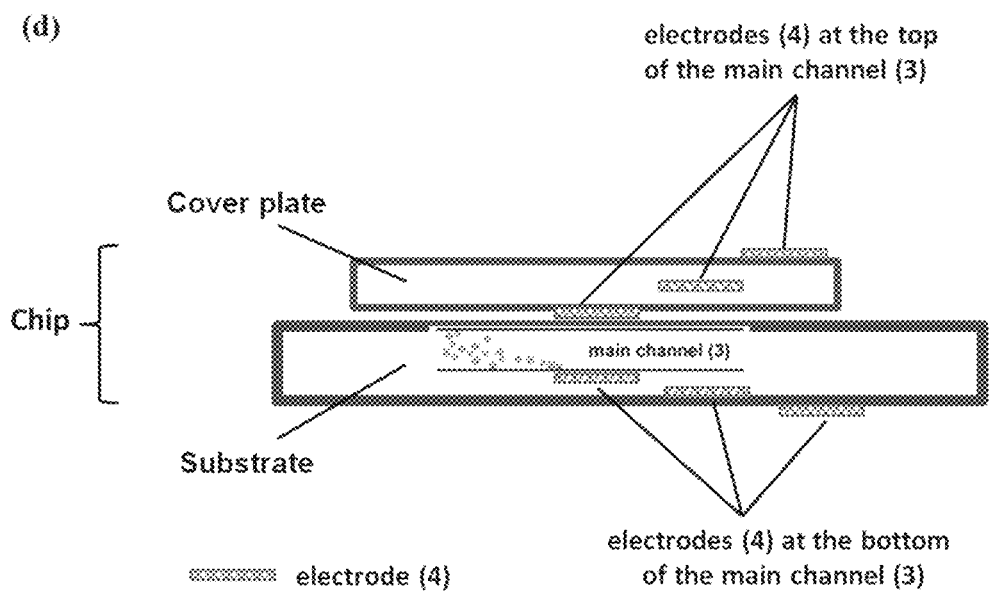

Unless otherwise stated, terms used in the present disclosure have the ordinary meaning as understood by one of ordinary skill in the art. The following are some of the meanings of the terms in the present disclosure. If there are any inconsistencies with other definitions, the following definitions will prevail.

Dielectrophoresis (DEP)

Dielectrophoresis, which is also known as two-dimensional electrophoresis, is a phenomenon that uncharged particles or particles with relatively low dielectric constant (both are regarded as dielectric) will experience a force and move in a specific direction in a non-uniform electric field. Electrode could be properly designed based on the differences in dielectric character, size and shapes of the particles so that particles can be manipulated or different particles can be separated. Due to the differences in polarization between the particles and their surrounding medium, positive dielectrophoretic force (pDEP) will be generated when the polarization capacity of the particles is higher than the medium, so that the particles are attracted towards the strong electric field zone under the influence of electric field; while negative dielectrophoretic force (nDEP) will be generated when the polarization capacity of the particles are weaker than the medium, so that the particles are repelled away from the strong electric filed. The dielectrophoretic force acting on uniform circular particles is calculated by the following formulation:

$$\langle F_{DEP}\rangle = 2\pi\varepsilon_m a^3 Re[f_{CM}(\omega)]\nabla|E|^2$$

wherein $\varepsilon_m$ is dielectrophoresis constant of the medium, a is the radius of a particle, E is the electric filed intensity, and Re{fCM(ω)} is Clausius Mossotti factor of the real part, also can be represented as:

$$f_{CM}(\omega) = \frac{\varepsilon_p^* - \varepsilon_m^*}{\varepsilon_p^* + 2\varepsilon_m^*}, \varepsilon^* = \varepsilon_0\varepsilon_r - i\frac{\sigma}{\omega}.$$

$\varepsilon_p^*$ and $\varepsilon_m^*$ are the complex number forms (which can be regarded as the capacity of inducing charges) of the particle and medium, respectively, ω is angular frequency of the applied electric field signal, σ is the electrical conductivity of material ($\sigma_m$ is the electrical conductivity of electrolyte, and $\sigma_p$ is electrical conductivity of microparticles), $\varepsilon_0$ is dielectric constant of vacuum, and $\varepsilon_r$ is dielectric constant of material relative to vacuum. As indicated by the above equation, positive or negative value of $f_{CM}(\omega)$ decides the direction of induced electric dipole. By selecting the frequency of applied electric field, the positive and negative value can be interchanged, therefore the same particle may experience positive dielectrophoretic force or negative dielectrophoresis under different conditions, or different particles may experience dielectrophoretic force of different polarity at the same time so as to be separated. It should be noted that the above theory is well-known to one of ordinary skill in the art, and the required electric field frequency may be obtained through routine experiments, so as to realize the manipulation and/or separation of any target particle with any applied electric field.

In addition, in the present disclosure, terms such as "dielectrophoresis focusing", "dielectrophoresis cell separation", "DEP focusing", "dielectrophoresis attracting" or "dielectrophoresis pulling" may also be used, sometimes "focusing" or "cell separation" is used for short. The above expressions have the same meaning, can exchange with each other. The specific meaning of the above all is that by the action of the dielectrophoresis-producing electrode (4), the target particles or cells move towards or far away from the dielectrophoresis-producing electrode (4) in a direction perpendicular to the chip.

Dielectrophoresis-Producing Electrode

Dielectrophoresis-producing electrode is electrode device that integrated in microfluidic chip and generates non-uniform electric field so as to induce the dielectrophoresis of particles. dielectrophoresis-producing electrode may be prepared on the substrate or cover plate of a chip by a method that is known in conventional art, such as photolithography, lift-off or magnetron sputtering method. Electrode material may be any material, such as Pt or Au, etc. In the present disclosure, the dielectrophoresis-producing electrode (4) is at the bottom of the main channel (3) indicates the dielectrophoresis-producing electrode (4) is placed on the upper surface of the chip substrate at the bottom of the main channel (3) (i.e., inner surface of the lower wall of the main channel), inside the chip substrate at the bottom of the main channel (3), or the outer surface of the bottom (FIG. 1(d)). The dielectrophoresis-producing electrode (4) is at the top of the main channel (3) indicates the dielectrophoresis-producing electrode (4) is placed on the lower surface, inside or on upper surface of the cover plate above the main channel (3) (FIG. 1(d)). The electrode generates an electric filed via an external signal generator, and an appropriate electric field intensity is determined according to the characteristic of the particle. For example, to separate cells, the electric field intensity E may be greater than $10^5$ V/m.

In an embodiment of the present disclosure, the microfluidic chip comprises a dielectrophoresis-producing electrode.

In another embodiment of the present disclosure, two or more dielectrophoresis-producing electrodes are successively disposed along the main channel of the microfluidic chip, wherein some of the electrodes are disposed at the top of the main channel and the other electrodes are disposed at the bottom of the main channel. Preferably, dielectrophoresis-producing electrode are alternately disposed at the top and bottom of the main channel.

In another embodiment of the present disclosure, the dielectrophoresis-producing electrode (4) is an electrode made of a conductive metal; in another embodiment, the dielectrophoresis-producing electrode is an electrode made of a photoconductive material having photoconductive effect, such as amorphous silicon or zinc oxide (ZnO), and these photoconductive materials are capable of producing non-uniform electric field when illuminated locally thereby generating dielectrophoretic force.

Separation Frequency Window

In the present disclosure, a separation frequency window as used herein refers to a certain frequency or frequency band of a non-uniform electric field (i.e., the electric field applied by the dielectrophoresis-producing electrode (4)) which generates dielectrophoretic force with different polarity for target cells and non-target cells so as to separate target cell flow from non-target cell flow. It can be concluded from the above definition that the separation frequency window is sometimes a certain frequency value, but it may be a certain range of the frequency, or "frequency band". Therefore, in the present disclosure, "separation frequency window", "separation frequency" or "separation frequency band" may interchange with each other when indicating separation frequency window and have substantially the same meaning.

In an embodiment, the microfluidic chip comprises a dielectrophoresis-producing electrode, which is capable of attracting or repulsing target particles while producing opposite effect for the non-target impurities by choosing a certain separation frequency window, so as to separate target particles from the impurities.

For example, a proper separation frequency window is chosen to produce positive dielectrophoretic force to induce the circulating tumor cells (CTC) in the whole blood sample to move to the surface of the dielectrophoresis-producing electrode, while generating negative dielectrophoretic force to repel the blood cells away from the surface of the electrode. Exemplary separation frequency as used in the present disclosure is 150 kHz. When the impedance measurement electrode and the dielectrophoresis-producing electrode are provided on the same side, CTCs are closer to the surface of the impedance measurement electrode, so that obvious impedance changes are detected. Alternatively, negative dielectrophoretic force can be produced within an appropriate separation frequency window to cause the circulating tumor cells (CTCs) in the whole blood sample to move away from the surface of the dielectrophoresis-producing electrode (4), while positive dielectrophoretic force is generated to attract blood cells to move towards the surface of the electrode. For this purpose, the impedance measurement electrode and the dielectrophoresis-producing electrode are located on the opposite surfaces of the microfluidic channel. In this way, CTCs and blood cells are arranged at different heights due to dielectrophoresis and when flowing through the impedance measurement electrode (5) positioned in the downstream, obvious impedance changes are detected as CTCs are closer to the surface of the electrode, while little or no signal changes from blood cells are detected due to the fact that blood cells are arranged at a height farther away from the detection electrode. As a result, CTCs in the blood sample can be calculated based on the pure CTC signals accurately and clearly measured according to the times of impedance changes detected by the chip in the present disclosure, while interference from blood cells is avoided.

In another embodiment, the microfluidic chip comprises two or more dielectrophoresis-producing electrodes, when distinct separation frequency windows can be chosen for different dielectrophoresis-producing electrodes to apply opposite dielectrophoretic forces on target particles. However, the position of dielectrophoresis-producing electrodes should be adjusted properly so that the target particles always move in one direction. For example, the microfluidic chip comprises two dielectrophoresis-producing electrodes with a first dielectrophoresis-producing electrode disposed at the top of the main channel, which can repel the target particles and attracts the impurities by choosing a separation frequency window so that the target particles are closer to the lower side; and a second dielectrophoresis-producing electrode disposed at the bottom of the main channel, which can attract the target particles and repels the impurities by choosing another separation frequency window so that the target particles can move further closer to the lower side The separation frequency window varies due to the differences in the applied non-uniform electric field distribution, target and non-target particle species, sizes and dielectricity, etc., therefore, there is no universally applicable frequency or frequency band with fixed value or values. However, after knowing the present disclosure, it is within the ability of one of ordinary skill in the art to adjust the applied electric field frequency based on the target particles to obtain the desired separation frequency window. Thus, it is not necessary for the present disclosure to give detailed explanation of how to obtain an appropriate separation frequency window for a particular target particle matter and related conditions.

Microfluidic Chip

Microfluidic chip, which is also known as lab on a chip or microfluidics, integrate each basic operating unit of a specific operation process on a chip of several square centimeters with micrometer-scale channel structure. In the present disclosure, "microfluidic chip", "microfluidics" and "chip" have the same meaning when referring to microfluidic chip, and may interchange with each other. Microfluidic chip may only comprise a substrate integrating the channel and/or electrode, or may comprise both a substrate and a cover plate, wherein the electrode may be integrated on the cover plate and the cover plate may form channels along with the substrate as well. Images of some chips disclosed in the art are shown in FIG. 1(c). Components such as the sample channel (1), the sheath fluid channel (2), the main channel (3), the dielectrophoresis-producing electrode (4) and the impedance measurement electrode (5) are integrated on the substrate and/or cover plate, and may be prepared by conventional process in the art, such as photolithography and etching method, etc. The sizes and relative proportions of each component are customized by one of ordinary skill in the art according to the size of the substrate and/or the cover plate, as well as the size of the target particle. In an exemplary embodiment of the present disclosure, both the sample channel (1) and the sheath fluid channel (2) have a width of 60 μm; the main flow channel has a width of 125 μm, and a height of 120 μm.

In the present disclosure, the material of the microfluidic chip may be selected from any conventional materials, such as any appropriate rigid material and/or elastic material. The rigid material may be inorganic rigid material such as monocrystalline silicon, amorphous silicon, glass, quartz, etc., or may be rigid organic material such as epoxy resin, polyurea, polyurethane, polystyrene, polymethyl methacrylate, etc. The appropriate elastic material mainly comprises polydimethylsiloxane (PDMS).

In the present disclosure, the microfluidic chip may be connected to external device directly through medium, such as conduit, wire, etc. to achieve the desired functions. For example, device such as the injection pump or automatic sample injector is connected to the sample channel for continuously or automatically injecting the sample and/or sheath fluid; electrical signal generators (such as DC power supply, AC power supply, transformer, etc.) are connected to the dielectrophoresis-producing electrode (4) to generate the non-uniform electric field, so as to apply dielectrophoretic force on particles; the impedance detection device is connected to an electrical signal generator, the electrical signal receptor and analyzer (such as computer) so as to detect, analyze and process the impedance signal of target particles.

Impedance Measurement Electrode

The principle of detecting and counting particles based on impedance is well known in the art: when the particles suspending in the electrolyte pass through a DC or an AC electric filed, an amount of electrolyte which has the same volume as the particles is replaced or partly replaced, causing transient variations of the resistance between two electrodes of the circuit, thereby producing a potential pulse. The intensity and number of pulse signal is proportional to the size and number of the particles, thereby being useful for the counting of various particles including blood cells.

Impedance measurement electrode (5) may be prepared on the surface of the substrate or the cover plate of the chip by conventional method in the art, such as photolithography, lift-off method, or magnetron sputtering method, etc. The material of the electrode may be any appropriate material with low value of resistance and not easily oxidized, such as Pt, Au, etc.

It should be noted that in order to achieve the aim of the present disclosure, the impedance measurement electrode (5) may be disposed at different positions, as long as being compatible to the position of the Dielectrophoresis-producing electrode (4) as well as the dielectrophoretic force applied on target particles. For example, if the dielectrophoresis-producing electrode (4) is integrated on the substrate, on the bottom of the main channel (3), and attracts target particles; or the dielectrophoresis-producing electrode (4) is integrated on the cover plate, on the top of the main channel (3), and repels the target particles, the target particles are drawn close to the lower side of the main channel. Then, in order to obtain differentiable signals, the impedance measurement electrode (5) is integrated on the bottom of the main channel (3), i.e., on the substrate.

On the contrary, if the dielectrophoresis-producing electrode (4) is integrated on the substrate, being on the bottom of the main channel (3), and repels the target particles; or the dielectrophoresis-producing electrode (4) is integrated on the cover plate, on the top of the main channel (3), and attracts the target particles, the target particles are all drawn close to the upper portion in the main channel (3). In this case, in order to obtain differentiable signals, the impedance measurement electrode may be integrated at the top of the main channel (3), such as on the cover plate.

In the present disclosure, that the impedance measurement electrode (5) is at the bottom of the main channel (3) indicates the impedance measurement electrode (5) is disposed on the upper surface (i.e., the inner surface of the lower wall of the main channel), interior, or outer surface of the substrate of the chip at the bottom region of the main channel (3). That the impedance measurement electrode (5) is at the top of the main channel (3) indicates the impedance measurement electrode (5) is disposed on the lower surface, interior or upper surface of the cover plate above the main channel (3).

In a more common embodiment of the present disclosure, a specific chip is prepared in advance, with dielectrophoresis-producing electrode (4) and impedance measurement electrode (5) in predetermined arrangement, such as on the bottom of the main channel (3). Then, by choosing a specific separation frequency window, the target particles are drawn close to the impedance measurement electrode (5) to achieve the purpose of detecting and/or counting.

The present disclosure may be further understood with reference to examples. However, it should be understood that these examples are not intended to limit the present disclosure. Variations of the present disclosure now known or further developed are considered to fall within the scope of the present disclosure as described herein and as claimed below.

EXAMPLE

Example 1 Preparation of Microfluidic Chip

The microfluidic chip shown in FIG. 1 was prepared by a conventional method in the field. The chip comprises a sample channel (1) in the middle and sheath channels (2) on both sides. The three channels were combined into the main channel (3) at the exit. Both the dielectrophoresis-producing electrode (4) and the impedance measurement electrode (5) were on the bottom of the main channel (3). The dielectrophoresis-producing electrode (4) was externally connected to an electrical signal generator, and the impedance measurement electrode (5) was connected to an electrical signal generator, an electrical signal receptor and an analyzer.

Example 2 A549 Lung Adenocarcinoma Cells and PBMC Cells were Effectively Distinguished by Using Dielectrophoresis Cell Separation Construction of A549 Cell Line with GFP Marker Original cell line: A549 human non-small cell lung cancer cell strain was purchased from ATCC. The cell strain was derived from a 58-year-old white male patient with lung cancer, and established in 1972 by D. J Gard, etc.

DNA expression vector: pLEIN vector, comprising a bicistron that expresses EGFP and neomycin resistance gene at the same time, and an internal ribosome entry site (IRES).

Cell culture, vector production, transfection and subcloning: packaging cell strain PT67 derived from NIH3T3 that expresses 10AI virus envelope was purchased from Clontech Laboratories, Inc. The PT67 cells were cultured in DMEM supplemented with 10% heat inactivated fetal calf serum (Gemini Bio-products, Calabasas, CA). For producing the vector, a mixture of 70% covered packaging cells (PT67), DOTAP reagent and pLEIN plasmid precipitate with a saturation capacity was cultured for 18 hours, when fresh medium was supplemented. Cells were examined by fluorescence microscopy after 48 hours. The cells were cultured in 500~2000 μg/mL G418 (Life Technologies, Inc., Grand Island, NY) for 7 days to select the GFP positive cells.

Retroviral transfection: A mixture of 20% covered A549 cells, retrovirus precipitate obtained by culturing PT67 cells and 10% fetal calf serum-containing PRMI1640 culture medium (Life Technologies Inc., the ratio of the two is 1:1) was cultured for 72 hours, when fresh medium was supplemented. 72 hours after transfection, A549 cells were harvested with trypsin/EDTA, and were passaged to a selective medium containing 200 μg/mL G418 at a ratio of 1:15. G418 was gradually increased to 800 μg/mL. Cell clones that express GFP were separated with trypsin/EDTA via cloning cylinder (Bel-Art Products. Pequannock, NJ), and were expanded and transferred by conventional methods.

Culture: cells are cultured by conventional method, specifically: in a 10% fetal calf serum-containing MEM-α medium, the cells were cultured in an incubator with 5% carbon dioxide at 37° C. After 48 hours, the culture dish was taken out, the original medium was removed before trypsin-EDTA solution was added, and then the mixture was incubated at 37° C. for 1 minute. After the cells peeled off from the bottle wall, an appropriate amount of serum-containing fresh medium was added to terminate the effect of trypsin. The suspension was removed after centrifugation, and fresh medium was added to obtain the experimental cells.

Test: two experimental groups and four control groups were provided, which were described in details as follows:

Experimental group 1: A549 cells (with GFP markers) in an initial concentration of $4*10^6$ cells/mL were serially diluted with PBS to about 4000 cells/mL. Cells were centrifuged at 800 rpm (1100 g) for 5 minutes, before the PBS was removed, and resuspended with isotonic electrolyte comprising 280 mM sucrose, 137 mM NaCl, 2.7 mM KCl, 4.3 mM $Na_2HPO_4$ and 1.47 mM $KH_2PO_4$, pH 7.4, and an electrical conductivity of 50 mS/m.

Test: the A549 cells were injected into the microfluidic chip via the sample channel (1), and the sheath fluid was added via the sheath channel (2) on both sides of the sample channel (1). The sheath fluid had the same ingredients with the above mentioned isotonic electrolyte, i.e., 280 mM sucrose, 137 mM NaCl, 2.7 mM KCl, 4.3 mM $Na_2HPO_4$ and 1.47 mM $KH_2PO_4$, pH 7.4 and an electrical conductivity of 50 mS/m. The channels of microfluidic chip had a size of 125 μm, the flow rate of the sample was 0.5 mL/hr, and flow rate of the sheath fluid was 2 mL/hr, indicating a flow speed ratio of 1:4. The sample flow was compressed to a single particle flow of about 30 μm by the sheath fluid flow. The dielectrophoresis-producing electrode (4) had an input voltage of 6V and a frequency of 150 kHz. The detection frequency of the impedance measurement electrode was set as 1 kHz~5 MHz, and the cut-off value of the impedance was set as 0.015 mV. Impedance cell counting is then carried out.

Experimental group 2: cell mixing were carried out first: 3 mL whole blood sample was taken, subjected to standard Ficoll centrifuge to obtain the PBMC product (~1.5 mL, containing ~$10^6$ cells), centrifuged and resuspended with isotonic electrolyte comprising 280 mM sucrose, 137 mM NaCl, 2.7 mM KCl, 4.3 mM $Na_2HPO_4$ and 1.47 mM $KH_2PO_4$, pH 7.4, and an electrical conductivity of 50 mS/m, before a certain amount (3~300 cells, may be gradient numbers) of A549 cells (initial amount was calculated based on the requirement of traditional chamber counter) were added.

Test: the mixed cells were injected into the microfluidic chip via the sample channel (1), and the sheath fluid was added via the sheath channel (2) on both sides of the sample channel (1). The sheath fluid had the same ingredients with the above mentioned isotonic electrolyte, i.e., 280 mM sucrose, 137 mM NaCl, 2.7 mM KCl, 4.3 mM $Na_2HPO_4$ and 1.47 mM $KH_2PO_4$, pH 7.4 and an electrical conductivity of 50 mS/m. The channels of microfluidic chip had a size of 125 μm, the flow rate of the sample was 0.5 mL/hr, and flow rate of the sheath fluid was 2 mL/hr, indicating a flow speed ratio of 1:4. The sample flow was compressed to a single particle flow of about 30 m by the sheath fluid flow. The dielectrophoresis-producing electrode (4) had an input voltage of 6V and a frequency of 150 kHz. The detection frequency of the impedance measurement electrode was set as 1 kHz-5 MHz, and the cut-off value of the impedance was set as 0.015 mV. Impedance cell counting was then carried out.

Control group 1: the cells added into the sample channel (1) was 1.5 mL PBMC, and the test conditions were the same as those in Experimental group 1 and 2.

Control group 2: the cells added into the sample channel (1) was 1.5 mL A549 cell in the isotonic electrolyte, and the dielectrophoresis-producing electrode (4) did not work. The test conditions were the same as those in Experimental group 1 and 2.

Control group 3: the cells added into the sample channel (1) was 1.5 mL PBMC, and the dielectrophoresis-producing electrode (4) did not work. The test conditions were the same as those in Experimental group 1 and 2.

Control group 4: the cells added into the sample channel (1) was 1.5 mL cell mixture of PBMC and 3~300 A549 cells, and the dielectrophoresis-producing electrode (4) did not work. The test conditions were the same as those in Experimental group 1 and 2.

Figure 2:
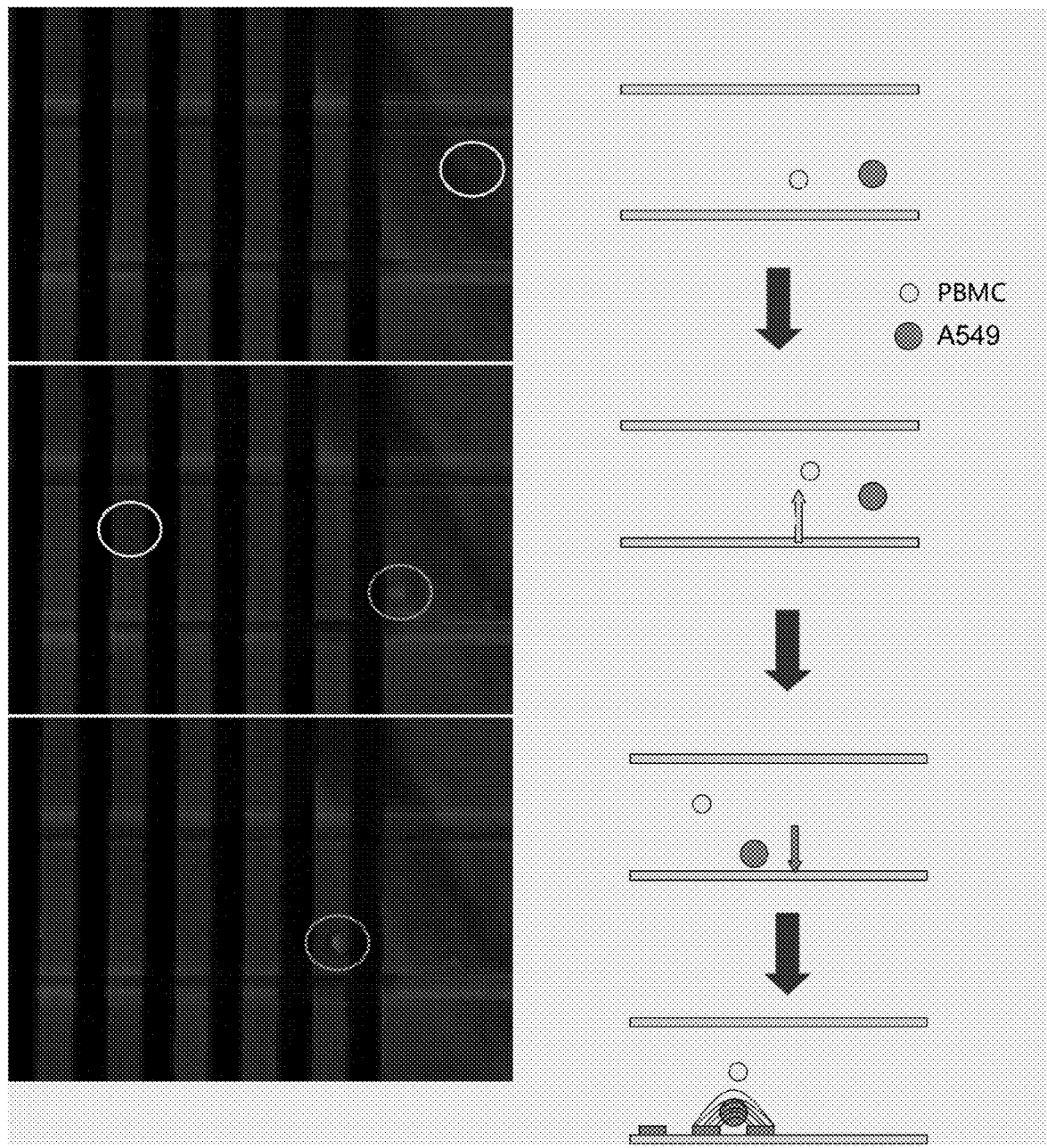
FIG. 2 is the motion trajectory (side view) of PBMC and A549 in the main channel (3) when the cell is subjected to dielectrophoresis. The left graph is an electron micrograph, and the right graph is a schematic diagram. The round circle in the left graph indicates a PBMC cell, which moves away from the lower electrode under the influence of the negative dielectrophoretic force (nDEP), while the round circle with a triangle arrow indicates a A549 cell, which moves towards the lower electrode under the influence of the positive dielectrophoretic force (pDEP).

Results: in the experimental groups, observed by the consecutive photographing, PBMCs were found to be gradually pushed away from the bottom electrode, while A549 cells gradually moved towards the electrode (FIG. 2).

Example 3 the Stability of Target Signal is Improving by Dielectrophoresis Focusing The test method was shown in Example 2. Results of the experimental group 1 and the control group 2 were compared.

Figure 3:
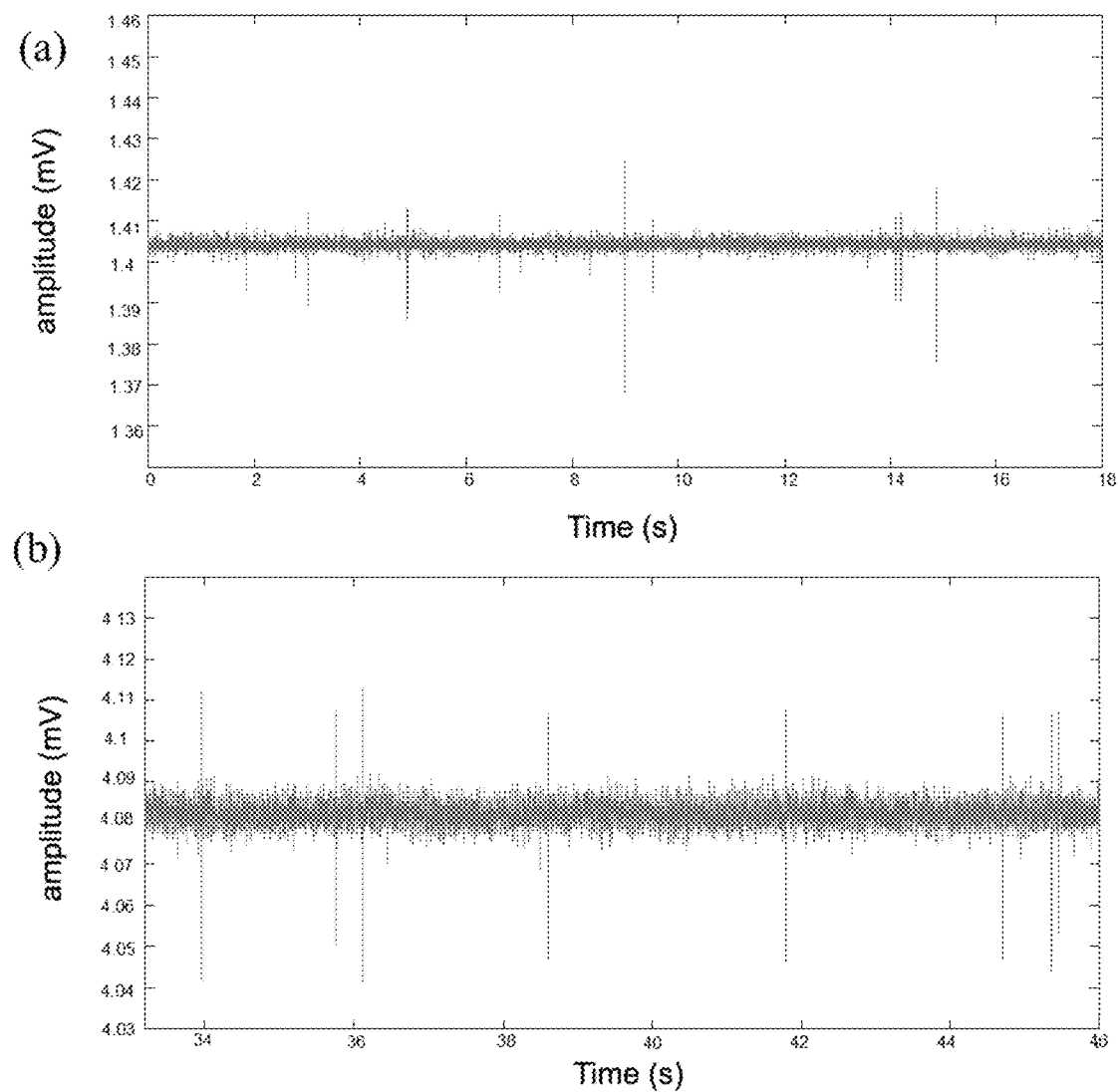
FIG. 3 shows the impedance signal from A549 cell samples.

Results: The peak values of impedance of the A549 cells in the experimental group 1 (FIG. 3b) and the control group 2 (FIG. 3a) were shown in FIG. 3. It was concluded that after applying an electric field with the dielectrophoresis-producing electrode (4), the A549 cells became closer to the impedance measurement electrode so that stronger signal was produced compared with the control group without dielectrophoresis focusing. In addition, A549 cells was focused in vertical direction, thus the position of A549 cells were more constant (FIG. 3b) in the direction perpendicular to the surface of the chip, leading to a more stable signal strength. While in control group without dielectrophoresis focusing, the A549 cells were not confined or focused in the vertical direction, so that the cells were dispersed, resulting in an unstable impedance signal, and inaccurate counting due to missed cells (FIG. 3a).

Example 4 The Specificity of Detection was Improved by Dielectrophoresis Cell Separation The test method was shown in Example 2. Results of the experimental group 1 and the control group 3 were compared.

Figure 4:
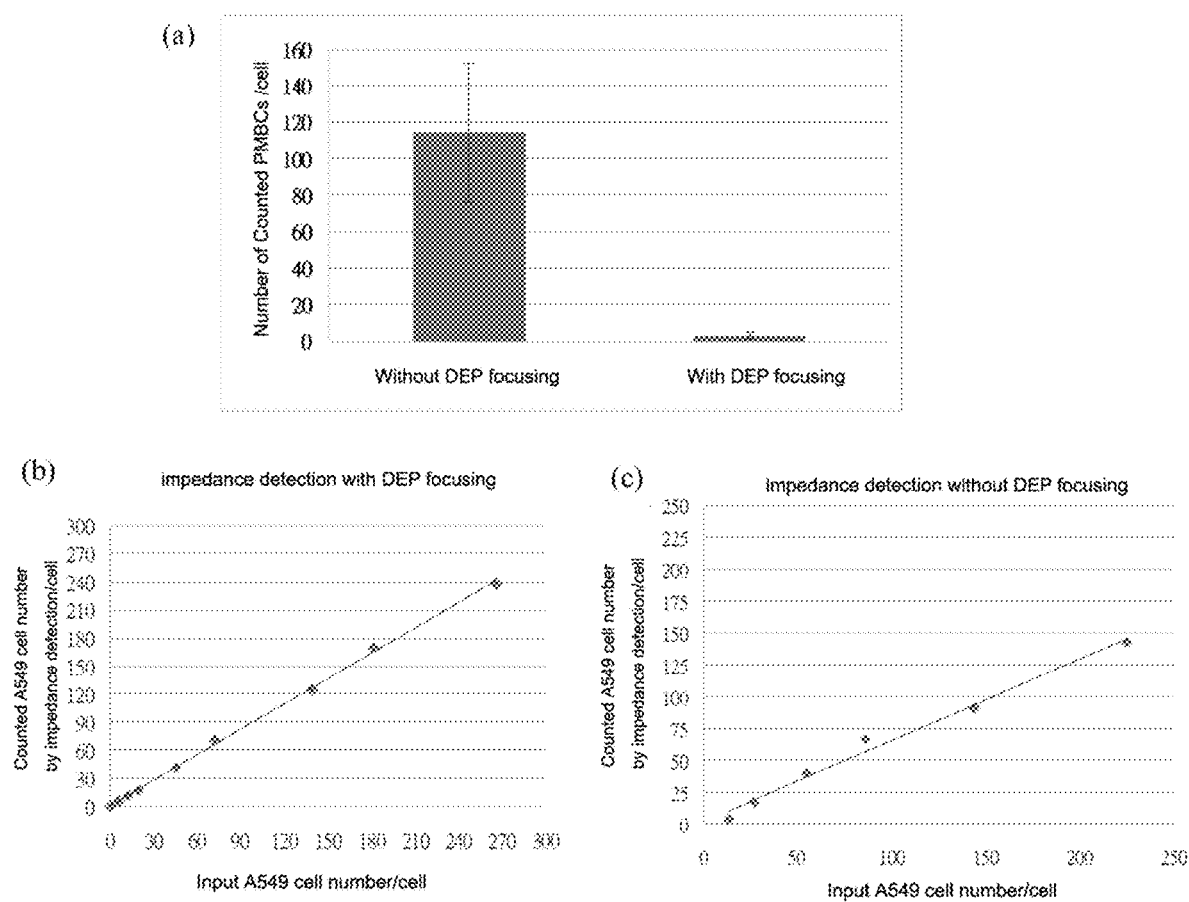
FIG. 4 (a) shows the counting results for the 1.5 mL PBMC samples subjected to cell separation by dielectrophoresis or not.

Results: during the preliminary experiment (n=20) in which the PBMC and blood cell samples were subjected to dielectrophoresis cell separation, the detection values for all the PBMC cells were less than 0.015 mV in 13 samples, and no more than five cells per sample showed detection values larger than 0.015 mV in the remaining seven samples. Therefore, the cut-off value was set as 0.015 mV. In control group 1 which was subjected to dielectrophoresis cell separation, the average counted cell number was merely 2~5 cells per repeat. However, in the control group 3 without dielectrophoresis focusing, 120 cells were counted on the average (FIG. 4a). In other words, without dielectrophoresis cell, more PBMC cells might be mistaken for the target cell (A549) and were counted.

Example 5 Dielectrophoresis Focusing Improved the Accuracy of Counting

The test method was shown in Example 2. Results of the experimental group 2 and the control group 4 were compared.

Results: the preliminary experiment (n>20) indicated that the maximum signal of A549 cells was 0.039 mV, and the minimum was 0.018 mV, thus the cut-off value of the signal was set as 0.015 mV. Values lager than 0.015 mV were signals of A549 cell, and the signals less than 0.015 mV were filtered. FIG. 4b and FIG. 4c showed that after the dielectrophoresis focusing, the counted cell number in the experimental group by impedance detection was pretty close to that of the initial amount, and the accuracy rate was up to nearly 93%; while in the control group 4 without dielectrophoresis focusing and separation, the accuracy rate of the impedance detection was only between 60% and 72%. In view of above, the accuracy rate of impedance cell counting was greatly improved by the method of the present disclosure.

The above descriptions are only preferred embodiments, which are only by way of example and not limitations of the combination of the features necessary to practice the present disclosure. The headings provided are not meant to limit the various embodiments of the invention.

In the present application, all publications and patents mentioned are incorporated herein by reference. Numerous modifications and variations of the described methods and compositions of the present invention will be apparent to one of ordinary skill in the art without departing from the scope and mental of the present disclosure. While the present disclosure has been described by way of specific preferred embodiments, it should be understood that the invention as claimed should not be unduly limited to these specific embodiments. In fact, many variations of the described modes for carrying out the present disclosure that are obvious to one of ordinary skill in the art are intended to be included within the scope of the appended claims.

What is claimed is:

1. A microfluidic chip for separating and detecting particles, comprising an inlet unit, a main channel (3), one or more dielectrophoresis-producing electric field generating units and an impedance detection unit, wherein
    the microfluidic chip comprises a substrate and a cover plate, the substrate is covered by the cover plate and the main channel (3) is between the cover and the substrate, or in the cover, or in the substrate;
    the main channel (3) comprises a bottom and a top, the top of the main channel (3) is a location at the side with the cover plate and the bottom of the main channel (3) is a location at the side opposite to the top and below the main channel (3);
    the inlet unit comprises one or more sample channels (1), and one or more sheath channels (2), the one or more sample channels (1) and the one or more sheath channels (2) converge at one end and are connected to the main channel (3), a sample flow and a sheath fluid flow into the main channel (3);
    the one or more dielectrophoresis-producing electric field generating units and the impedance detection unit are successively provided on the main channel (3);
    the one or more dielectrophoresis-producing electric field generating units comprise one or more dielectrophoresis-producing electrodes (4) that is/are for generating a non-uniform electric field in the direction perpendicular to the main channel, wherein the one or more dielectrophoresis-producing electrodes (4) is/are disposed at only the top of the main channel (3) or the bottom of the main channel (3);
    and
    the impedance detection unit comprises an impedance measurement electrode (5) provided at the top of the main channel (3) or the bottom of the main channel (3).

2. The microfluidic chip according to claim 1, wherein the one or more dielectrophoresis-producing electric field generating unit is/are provided at only one side of the main channel.

3. The microfluidic chip according to claim 1, wherein the one or more dielectrophoresis-producing electrodes (4) is/are provided at the bottom of the main channel (3) on the substrate of the microfluidic chip.

4. The microfluidic chip according to claim 1, wherein the one or more dielectrophoresis-producing electrodes (4) is/are provided at the top of the main channel (3) on the cover plate above the substrate of the microfluidic chip.

5. The microfluidic chip according to claim 1, wherein the impedance measurement electrode (5) is provided at the bottom of the main channel (3) on the substrate of the microfluidic chip.

6. The microfluidic chip according to claim 1, wherein the impedance measurement electrode (5) is provided at the top of the main channel (3) on the cover plate above the substrate of the microfluidic chip.

7. The microfluidic chip according to claim 1, wherein the one or more dielectrophoresis-producing electrodes (4) is/are a conductive metal electrode or a photoelectric material having photoconductive effect.

8. The microfluidic chip according to claim 7, wherein the photoelectric material is amorphous silicon or zinc oxide.

* * * * *